United States Patent

France, deceased et al.

Patent Number: 5,313,771
Date of Patent: May 24, 1994

[54] RUBBER BATT FOR A COTTON STRIPPER

[76] Inventors: L. D. France, deceased, late of Lubbock, Tex.; by L. D. France, legal representative, Rt. 3, Box 303, Slaton, Tex. 79364

[21] Appl. No.: 905,010
[22] Filed: Jun. 25, 1992
[51] Int. Cl.$^5$ ............................................. A01D 46/12
[52] U.S. Cl. ........................................ 56/33; 56/16.6; 56/DIG. 19; 56/126
[58] Field of Search ............... 56/33, 327.1, 327.2, 56/328.1, DIG. 19, 126; 460/114, 134, 123, 121; 198/498, 690.2, 722, 723

[56] References Cited

U.S. PATENT DOCUMENTS

| | | |
|---|---|---|
| 2,673,440 | 3/1954 | Sawyer . |
| 2,825,195 | 3/1958 | Smith . |
| 3,678,677 | 7/1972 | Miller et al. ............... 56/327.1 |
| 3,888,370 | 6/1975 | Gamblin ..................... 56/328.1 X |
| 5,036,653 | 8/1991 | Klinner et al. ............... 460/121 X |
| 5,076,046 | 12/1991 | Schilling ..................... 56/327.1 |
| 5,109,976 | 5/1992 | Mohri et al. .................... 198/498 |

Primary Examiner—Stephen J. Novosad
Attorney, Agent, or Firm—Novak, Vickers & Burt

[57] ABSTRACT

Structure for stripping cotton bolls from cotton stalks comprising a rubber batt having a rounded head and a toed foot; said foot being formed so that it may be installed into a lipped channel strip for connection to a rotatable shaft. The rounded head of the batt provides a buffering contact area between the batt and a cotton stalk thereby preventing excessive chipping of bark from the cotton stalk during harvesting operations. This results in production of a more pure cotton product by minimizing a cotton stripper's collection of foreign matter together with the desired cotton bolls.

14 Claims, 1 Drawing Sheet

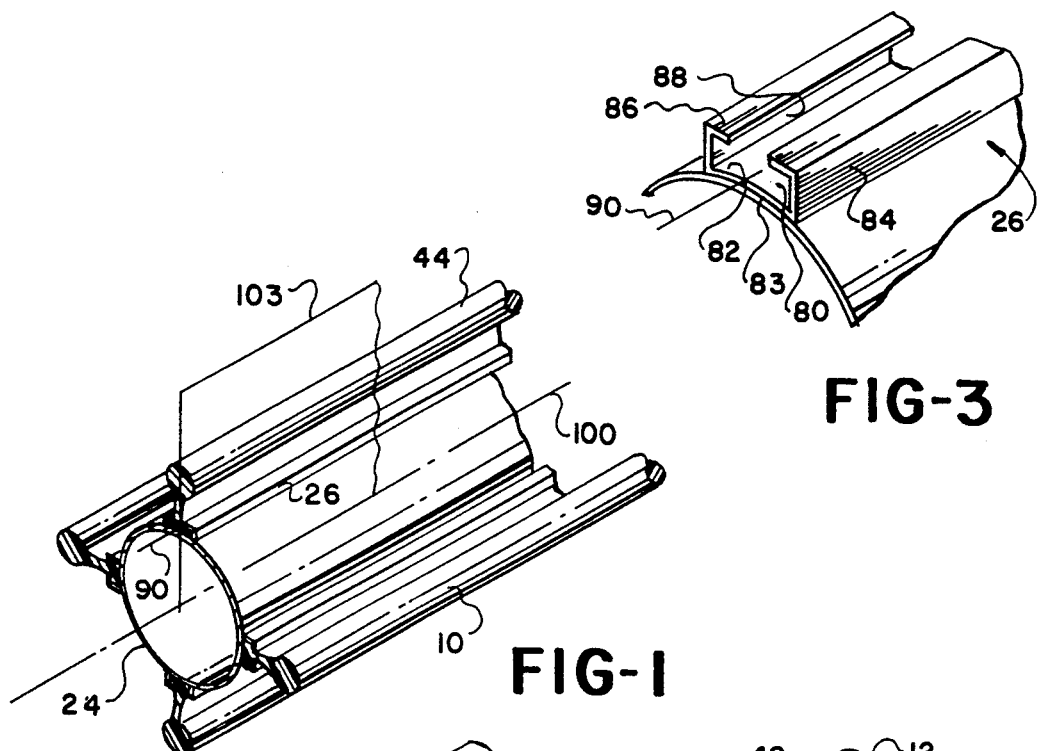
FIG-3
FIG-1
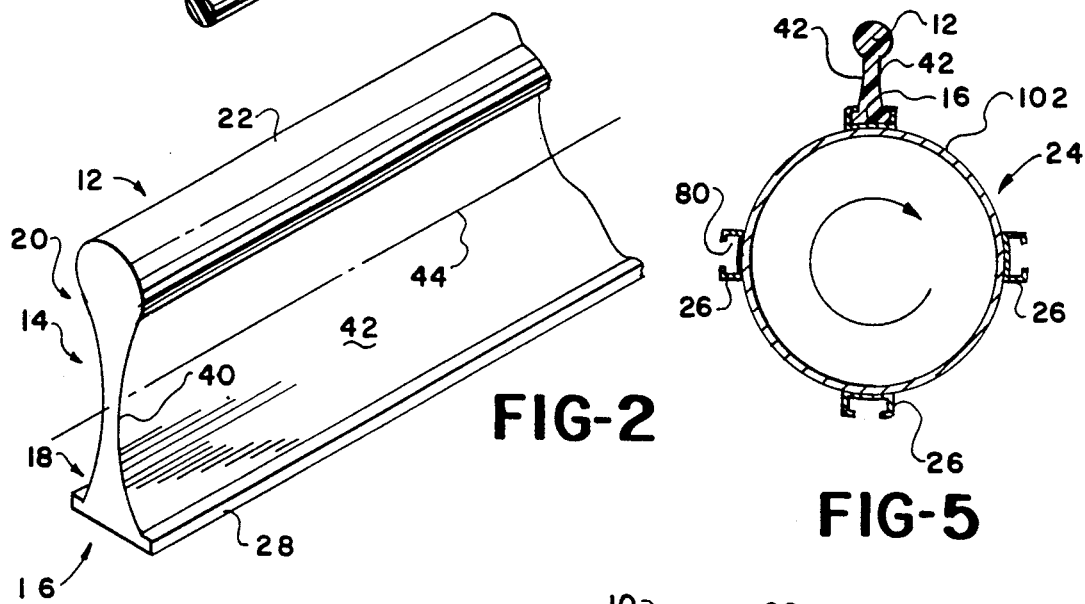
FIG-2
FIG-5
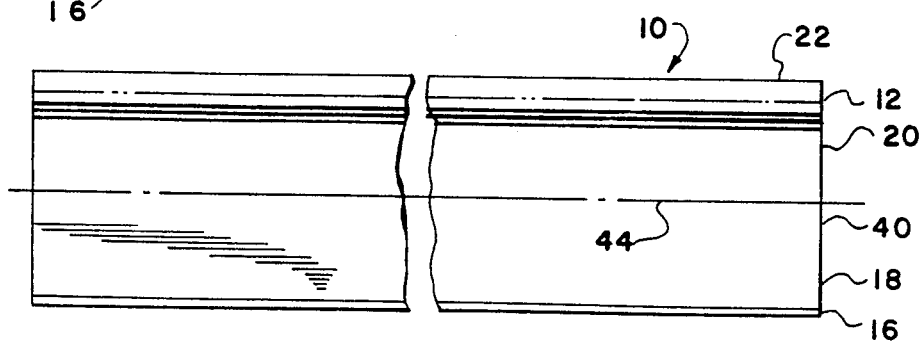
FIG-4

RUBBER BATT FOR A COTTON STRIPPER

RIGHTS TO INVENTIONS UNDER FEDERAL RESEARCH

There was no federally sponsored research and development concerning this invention.

BACKGROUND OF THE INVENTION

Field of the Invention

This invention relates generally to harvesting of agricultural produce. More particularly, this invention relates to rubber batts that are used in cotton strippers to remove or harvest cotton bolls from the associated cotton stalks on which the cotton bolls have been grown. Those having skill in the art are makers and users of cotton stripping equipment.

Description of the Related Art

Cotton strippers are well known devices in the agricultural industry. Typically, a cotton stripping machine will be self-contained and motor propelled so that the machine is capable of being driven through a cotton field for the purpose of stripping cotton bolls from mature cotton stalks.

It is not unusual for the means by which the cotton is stripped from the stalk to take the form of rubber type bats that radiate outwardly from a rotatable spindle or shaft. Oftentimes, two like equipped spindles will be utilized in tandem upon a row of cotton stalks. Each batted spindle rotates in a direction counter to the other of the pair and together the opposingly operating bats strip the cotton bolls from the stalks and direct said removed bolls into the stripper machine for collection.

U.S. Pat. Nos. 2,673,440 issued to F. D. SAWYER, et al for a Crop Stripping Means and 2,825,195 issued to H. P. SMITH for a Cotton Stripper each illustrate conventional cotton strippers.

SAWYER discloses a longitudinally extending shaft adapted to be rotatably driven. Along the length and at the exterior of the shaft are longitudinally extending U-shaped bristle brush backing strips. Bristle brushes are installed into the backing strips so that the bristles of the brushes extend radially outward from the shaft. It is explained that these bristle brushes are used to selectively strip a crop, like cotton, from its associated plant.

SMITH also discloses rotatable axes or bodies upon which rubber feathers or fingers are attached. It is explained that the flexibility of the fingers determines how much wiping action versus beating or batting action occurs upon the plant stalk. It should be noted that the distal ends of the SMITH fingers are blocked or squared off in shape; thereby giving the finger a generally rectangular shape in cross section.

A deficiency associated with presently available rubber batts that are intended to be installed upon each of a stripper's rotatable shafts is said batt's sharp edges at its distal end. The sharp edges occur at the corners of the block shaped end. During harvesting, the batts will typically first contact the plant at one of the said batt's sharp corners. The contact is abrupt and forceful; said contact must be forceful to "bat" the produce or cotton bolls from the plant stalk. This forceful contact, however, oftentimes causes portions of the plant to be broken or chipped away that are not desired.

In the instance of cotton stripping, portions of the bark from the stalk of the cotton plant is often chipped away from the plant by the batting process. When this occurs, the undesired bark fragments are commingled with the desired cotton bolls. The resulting product is impure bales of cotton commonly referred to as "barkies".

Another drawback of the sharp edged shape of the batt is that the corners of the blocked ends make the initial and most prolonged contact with the plant being stripped. Therefore, the same corners suffer most of the abrading wear of the stripping process because of the limited surface area at this point of contact. As a result, the service life of conventional batts is compromised because of their shape.

SUMMARY OF THE INVENTION

(1) Progressive Contribution to the Art

As noted in SMITH, it has been a long recognized goal of the crop stripping industry to remove only the desired produce from a plant and not additional foliage or bark. This invention produces such results through its unique shape and design.

The rounded head of the present invention provides a greater surface area for contacting the plant to be stripped. The rounded shape additionally helps to prevent the batt from cutting into the plant itself. Furthermore, the rounded head does not have sharp edges and therefore less bark and undesired foliage is chipped or stripped from the plant stalks.

The flared body ends of the batt affords a greater surface area at the point of joinder between the batt body and the head and foot for connection therebetween. The greater area provides for a sturdy batt in which the components that make up the batt are securely joined together.

By utilizing the present invention, a rubber batt, less stray and undesired material is collected from the plant stalks. When used to strip cotton, the rubber batt produces a higher grade cotton because of the reduction in impurities that are commingled with the desired cotton bolls.

Still further, the life of batts made according to the present invention is greater than those having blocked or squared heads. A longer service life results from the batt incurring evenly distributed wear at its distal end upon the rounded head.

Additionally, the life of the rubber batt is extended because it is constructed from a specially blended and wear resistant rubber composition.

The batts described herein are also used as fan blades in structures located further up into the cotton strippers. In this service, the batts are likewise radially oriented off of rotatable shafts. When in operation, the batts act to whisk and blow the harvested cotton bolls toward the receiving and collection bin portion of the cotton stripping machine. In this service, the rubber batt enjoy the same prolonged service life as those batts used to actually harvest the cotton from the cotton stalk.

Objects of this Invention

An object of this invention is to provide a cotton stripping batt that removes less bark from cotton stalks during the harvesting process than previously available batts.

Another object of this invention is to produce a cotton product that has a minimum of impurities commingled therein.

Another object of this invention is to provide a stripping batt having an extended service life over presently available batts.

Further objects are to achieve the above with devices that are sturdy, compact, durable, simple, safe, efficient, versatile, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people for implementation.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 1 is a perspective view of four batts installed upon a tubular rotatable shaft.

FIG. 2 is a perspective view of a single batt.

FIG. 3 is a perspective view of a single channel strip.

FIG. 4 is an elevational view of a single batt.

FIG. 5 is a cross-sectional view of a single batt installed upon a shaft.

As an aid to correlating the terms of the claims to the exemplary drawings, the following catalog of elements and steps is provided:

```
10  batt
12  batt head
14  batt body
16  batt foot
18  flared foot end
20  flared head end
22  head top
24  tubular rotatable shaft
26  foot channel strip
28  foot toe
40  batt body midsection
42  batt body sides
44  batt body longitudinal center line
80  channel strip interior
82  channel bottom side
83  channel bottom exterior surface
84  channel lateral side
86  channel lips
88  channel gap
90  channel longitudinal center line
100 shaft longitudinal center line
102 shaft exterior surface
103 bisecting plane
```

DESCRIPTION OF THE PREFERRED EMBODIMENT

Referring to FIG. 1 of the drawings, a rotatable harvesting shaft 24 of a cotton stripping machine may be seen with batt 10 mounted thereupon. Said shaft 24 is connected to the cotton stripping machine in such a way that the machine drives the shaft 24 rotatably. The shaft 24 has a length and a shaft longitudinal center line 100. It is about the shaft's center line 100 that said shaft 24 rotates. The shaft 24 may have any elongated shape, but what is shown and preferred is a cylindrically shaped shaft 24 having a rounded exterior surface 102 along the length of said shaft 24.

Foot channel strips 26 may be seen in FIGS. 1 and 4. In the preferred embodiment, the channels 26 take the form of a lipped and U-shaped elongate strip. Each channel 26 has a channel bottom side 82 and a channel bottom exterior surface 83. When the strip 26 is installed upon the shaft 24, the channel bottom exterior surface 83 rests flush and with face-to-face contact with the shaft exterior surface 102. Therefore, the bottom exterior surface 83 of the channel 26 is made to conform to the exterior of the shaft 102; in the preferred embodiment in which the shaft 24 is cylindrical, the curvature of the bottom exterior surface 83 is concave.

Each channel 26 has two channel lateral sides 84 that would project upwardly from the bottom side 82 at right angles if said bottom side 82 were flat. Said lateral sides 84 are joined to the bottom side 82 at exterior sides or edges of said bottom side 82. That is, the sides 84 are parallel to a radial plane extending from the shaft longitudinal center line 100 and intersecting a channel longitudinal center line 90 of the channel 26. The longitudinal center line 90 of the channel 26 is located midway across the width of the bottom side 82 of the channel 26 and along said channel's 26 length. Said width of the bottom side 82 being measured between the lateral sides 84.

Inwardly projecting channel lips 86 are connected at distal or upper ends of each lateral side 84 away from said side's 84 connection to the bottom side 82. Both lips 86 extend toward the other with a channel gap 88 remaining between distal ends of said lips 86. In the preferred embodiment, the two lips 86 on a particular channel strip 26 are configured so that they are perpendicular to the above referenced radial plane extending from the center of the shaft 24 and intersecting a longitudinal center line 90 of the channel 26.

The channel strip 26 may be either temporarily or permanently connectable to the shaft 24. In the installed configuration, the longitudinal center line 90 of the channel 26 is parallel to the longitudinal center line 100 of the shaft 24. In the event that the installation of the channel 26 onto the shaft 24 is permanent, it is contemplated that fixation of the channel 26 may be accomplished by an adhesive or by such mechanical means as riveting. In the event that the connection is temporary, it is contemplated that said connection may be affected by such means as screwing the channel strips 26 to the shaft 24.

The batt 10 comprises a batt body 14; said body 14 having a flared foot end 18 and a flared head or distal end 20. A batt head 12 is found at the head end 20 of the body 10 and a batt foot 16 is found at the foot end 18 of the body 14. A top surface of the head 12 is referred to as a head top 22. Said head top 22 is located at an opposite end of the batt 10 from the foot 16.

A batt body midsection 40 is a portion of the batt body 14 located between the ends 18 and 20. The batt 10 has a height measured between a bottom surface of the foot 16 and a top surface of the head 12 at the head top 22. It is preferred that the height of the batt 10 be at least two inches thereby providing adequate flexibility of the batt body 14.

Said batt 10 is designed to be installed into the foot channel 26 thereby connecting the batt 10 to the rotatable shaft 24. When installed, the batt 10 is oriented so that said batt extends radially away from the exterior surface 102 of the shaft 24 with the foot 16 of the batt closest to the shaft 24 and the batt head top 22 most distally located from the shaft 24. In this configuration, the batt 10 has a bisecting plane that is approximately coincident with a radial plane extending from the center line 100 of the shaft 24 that intersects a longitudinal center line 90 of the channel 26. In the embodiment shown, the batt 10 is symmetrical about the bisecting plane.

The foot 16 of the batt 10 has a bottom surface and two side surfaces; said side surfaces, one each being located at the end of two foot toes 28. The foot 16 is designed to be installed into a channel strip interior 80 of the channel strip 26. Said interior 80 being defined by the bottom side 82, two lateral sides 82 and the two channel lips 86 of said channel 26. It should be understood that there is a space or a channel gap 88 between free ends of the two lips 86 through which the body 14 of the batt 10 protrudes when installed in the channel 26. When the batt 10 is installed into the channel 26, a batt body longitudinal center line 44 is approximately parallel to the other longitudinal center lines 90 and 100. The center line 44 also lies within the bisecting plane described above. The batt 10 has batt body sides 42 between which widths of the batt body 14 are measured. The batt body longitudinal center line 44 lies midway between the body sides 42 perpendicular to the body's 14 width. It is along the body longitudinal center line 44 that the length of the batt 10 and batt body 14 are measured.

Because it is desired that the fit between the foot 16 and the interior 80 of the channel 26 be snug, the dimensions of the foot 16 are approximately the same as the dimensions of the strip interior 80. The dimensions of the two components may be approximately the same because of the flexibility of the rubber batt 10 and said batt's 10 ability to conform to the restrictive interior 80 of the channel 26.

The two foot toes 28 are located one each on lateral sides of the foot 16. Said toes 28 extend outwardly from the foot 16 and have an exterior surface that is rectangularly shaped. Each toe 28 is held within the channel 26 by a respective lip 86 of said channel 26; said lips 86 covering the toes 28 when the foot 16 is installed into the channel 26. It is in this manner that the batt 10 is prevented from being pulled from the channel and disengaged from the shaft 24.

The batt foot 16 is joined to the batt body 14 at the flared foot end 18 of said body 14. At an opposite end of the body 14, the flared head end 20, the batt head 12 is joined to the body 14. While the head 12, body 14, and foot 16 are described herein as being joined together, in the preferred embodiment of the batt 10 the several components of the batt 10 are molded as one unitized continuously solid piece.

The head 12 has an exterior shape or surface that is curvilinear. In the preferred embodiment, the head's 12 exterior surface is predominantly cylindrical in shape, thereby providing the head top 22 a rounded exterior surface.

The foot end 18 and the distal end 20 of the body 14 flare in width to accommodate a secure joinder of the body 14 to the foot 16 and head 12, respectively. By flaring the body ends 18 and 20 in this manner, connection between the components is affected over a greater area. It should also be noted that in the preferred embodiment, the width of the body midsection 40 is less than the width of the body's flared ends 18 and 20. The narrower midsection 40 assures that adequate flexion of the batt body will be available during harvesting operations. In the installed configuration, it is the batt head 12 that flexes or moves relative to the batt foot 16 that is secured to the shaft 24.

The method of installation of the batt 10 onto the shaft 24 may include manufacturer mating of said batt 10 to the channel strip 26. In this case, the connection between the channel 26 and the shaft would be temporary and of a nature describe above. That is, the end user would receive the batt 10 with a channel 26 already incorporated into the product so that that end user need only to exchange the channel 26 equipped batt 10 for the used batt needing replacement.

Alternatively, if the channels 26 are permanently fixed to the shaft 24, it is contemplated that the worn out batt 10 may be withdrawn from its securing channel strip 26 and a new rubber batt 10 slid, or otherwise installed, into the permanently mounted channel strip 26.

It should be understood that the methods described herein for installation of the rubber batt are only exemplary; it is further contemplated that the unique batts 10 could be installed in other ways. One alternative method of installation could include molding the batt 10 as a unitary component of sections of the shaft 24 that are then bolted, or otherwise joined together, to form a batted shaft. A variation of this concept is illustrated in the SMITH patent.

The embodiments and methods shown and described above are only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim:

1. A structure for harvesting cotton boles from the associated cotton stalks on which the cotton boles have grown, comprising:
   a. a batt body having two ends;
   b. a batt foot joined to said batt body at one of said batt body's ends;
   c. said batt foot adapted for connection with a rotatable shaft;
   d. a batt head joined to said batt body at an end of said batt body opposite the end of said batt body to which said foot is joined to the batt body;
   e. said batt head having an exterior shape that is curvilinear;
   f. said batt foot having two toes;
   g. said toes being located, one each, on two sides of said foot;
   h. said toes extending outwardly from the foot;
   j. said batt head having a rounded exterior shape;
   k. one end of said body being a foot end;
   l. one end of said body being a head end;
   m. said head end being opposite said foot end;
   n. the batt foot being joined to said batt body at the foot end of said body;
   o. the batt head being joined to said batt body at the head end of said body;
   p. said head end of said body being flared at said head end's point of joinder with the batt head;
   q. said flared head end providing greater surface area for the joinder of said batt head to said batt body at the head end thereby facilitating a secure connection therebetween;

r. said foot end of said body being flared at said foot end's point of joinder with the batt foot;

s. said flared foot end providing greater surface area for the joinder of said batt foot to said batt body at the head end thereby facilitating a secure connection therebetween;

t. a midsection of the body located between the head and foot ends being narrower than said flared ends of the body;

u. said narrow midsection promoting flexibility of the batt;

v. said body having a length and two sides;

w. said body having widths measured between said two sides;

x. said body having a longitudinal center line extending along said body's length;

y. said longitudinal center line being located midway across the width of said body;

z. said body being symmetrical about a bisecting plane located midway across the width of said body and coincident with said longitudinal center line and extending from said head end to said foot end and along the length of said body;

aa. a channel strip capable of mating with said foot for connection to said foot along the length of said batt body; and bb. a rotatable shaft to which said channel strip is connectable.

2. A structure for harvesting cotton bolls from the associated cotton stalks on which the cotton bolls have grown as recited in claim 1, further comprising:

cc. said toes shaped to mate snugly with said channel strip.

3. A structure for harvesting cotton bolls from the associated cotton stalks on which the cotton bolls have grown as recited in claim 2, further comprising:

dd. said toes having an exterior surface that is rectangularly shaped to mate securely with an interior of the channel strip.

4. A structure for harvesting cotton bolls from the associated cotton stalks on which the cotton bolls have grown as recited in claim 3, further comprising:

ee. said interior of the channel strip being bounded by:
1. a channel bottom side,
2. two channel lateral sides, each lateral side connected to the channel bottom side,
3. two channel lips, one each connected to each of the two lateral sides,
4. each lip connected to an end of a lateral side opposite said lateral side's connection to the bottom side,
5. each lip extending inwardly from the lateral side to which said lip is connected so that the two lips of a channel extend toward each other, and
6. each lip having a length that permits a gap to remain between said lips of the channel strip.

5. A structure for harvesting cotton bolls from the associated cotton stalks on which the cotton bolls have grown as recited in claim 4, further comprising:

ff. said channel strip having a length and a width, said length measured perpendicular to said width;

gg. said channel strip having a longitudinal center line extending along the strip's length;

hh. said rotatable shaft having a longitudinal center line parallel to the longitudinal center line of the channel strip.

6. A structure for harvesting cotton bolls from the associated cotton stalks on which the cotton bolls have grown as recited in claim 5, further comprising:

jj. said bottom side of the channel being shaped so that a bottom surface of the bottom side conforms to an exterior surface of the rotatable shaft thereby allowing flush face-to-face contact between the two surfaces.

7. A structure for harvesting cotton bolls from the associated cotton stalks on which the cotton bolls have grown as recited in claim 6, further comprising:

kk. said batt having a height measured from a bottom of the foot to a top of the head; and ll. said height being at least two inches thereby providing sufficient flexibility of the body.

8. A structure for harvesting cotton bolls from the associated cotton stalks on which the cotton bolls have grown as recited in claim 7; further comprising:

mm. said channel strip temporarily connectable to said rotatable shaft.

9. A structure for harvesting cotton bolls from the associated cotton stalks on which the cotton bolls have grown as recited in claim 7, further comprising:

mm. said channel strip permanently connectable to said rotatable shaft.

10. A cotton stripping machine for harvesting cotton bolls from associated cotton stalks on which the cotton bolls have grown, comprising:

a harvesting shaft connected to said cotton stripping machine for rotation relative thereto;

at least one batt body having a length and being connected to and along a length of said harvesting shaft for rotation therewith;

each batt body comprising a foot adapted for connective engagement with said harvesting shaft, said foot being joined to said batt body along the length of said batt body;

each batt body comprising a curvilinear shaped head opposite said foot, said head being joined to said batt body along the length of said batt body;

said batt body being flared at points of joinder with said foot and said head so that a midsection of said body located between said head and said foot has a width narrower than said flared points of joinder and said head and said foot, thereby allowing said batt body to flex during use.

11. The cotton stripping machine for harvesting cotton bolls from associated cotton stalks on which the cotton bolls have grown as recited in claim 10 wherein said batt body, including said head and said foot, forms a continuous solid.

12. The cotton stripping machine for harvesting cotton bolls from associated cotton stalks on which the cotton bolls have grown as recited in claim 11 wherein said batt body is constructed from rubber.

13. The cotton stripping machine for harvesting cotton bolls from associated cotton stalks on which the cotton bolls have grown as recited in claim 12, further comprising:

at least one channel strip mounted along the length of said harvesting shaft;

said channel strip capable of mating with said foot for connecting said batt body to said harvesting shaft.

14. A structure for harvesting cotton bolls from the associated cotton stalks on which the cotton bolls have grown, comprising:

a batt body having two opposing ends, a head end and a foot end;

said body also having a length and two sides;
a batt foot joined to said batt body at said batt body foot end;
a batt head joined to said batt body at said batt body head end;
said batt head having an exterior shape that is curvilinear;
said batt foot having two toes;
said toes being located, one each, on two sides of said foot;
said toes extending outwardly from the foot;
a channel strip capable of mating with said foot for connection to said foot along the length of said batt body; and
said channel strip being designed for connection to a rotatable shaft.

* * * * *